US011260853B2

(12) United States Patent
Kamiya et al.

(10) Patent No.: US 11,260,853 B2
(45) Date of Patent: Mar. 1, 2022

(54) COLLISION AVOIDANCE DEVICE AND COLLISION AVOIDANCE METHOD FOR VEHICLE

(71) Applicant: DENSO CORPORATION, Kariya (JP)

(72) Inventors: Kei Kamiya, Kariya (JP); Yosuke Ito, Kariya (JP); Takaharu Oguri, Kariya (JP); Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 259 days.

(21) Appl. No.: 16/438,890

(22) Filed: Jun. 12, 2019

(65) Prior Publication Data
US 2019/0291730 A1 Sep. 26, 2019

Related U.S. Application Data

(63) Continuation of application No. PCT/JP2017/044764, filed on Dec. 13, 2017.

(30) Foreign Application Priority Data

Dec. 14, 2016 (JP) .............................. JP2016-242119

(51) Int. Cl.
*B60W 30/09* (2012.01)
*B60W 30/095* (2012.01)
(Continued)

(52) U.S. Cl.
CPC .......... *B60W 30/09* (2013.01); *B60W 30/095* (2013.01); *B60W 30/0956* (2013.01);
(Continued)

(58) Field of Classification Search
CPC ... B60W 2050/0089; B60W 2050/143; B60W 2554/4041; B60W 30/09; B60W 30/095; B60W 30/0956; B60W 50/14; B62D 15/0265; B62D 6/00; G06K 9/00201; G06K 9/00798; G06K 9/00805; G06K 9/00825; G08G 1/16; G08G 1/166; G08G 1/167
See application file for complete search history.

(56) References Cited

U.S. PATENT DOCUMENTS 7,124,027 B1 * 10/2006 Ernst, Jr. ............... G01S 13/931
701/301
7,765,066 B2 * 7/2010 Braeuchle ........... B60W 30/095
701/301
(Continued)

FOREIGN PATENT DOCUMENTS

JP 2005-149402 A 6/2005
JP 2008-102690 A 5/2008
(Continued)

*Primary Examiner* — Babar Sarwar
(74) *Attorney, Agent, or Firm* — Maschoff Brennan

(57) ABSTRACT

A collision avoidance device for a vehicle is provided. The collision avoidance device includes an object sensing unit for sensing an object, an attribute acquisition unit for using a sensing result from the object sensing unit to acquire an attribute of an oncoming vehicle, and a collision avoidance execution unit for executing at least one of a notification of a possibility of collision and a collision avoidance operation, if it is determined, based on the attribute acquired by the attribute acquisition unit, that the oncoming vehicle crosses a center line.

10 Claims, 6 Drawing Sheets

(51) Int. Cl.
 B60W 50/14 (2020.01)
 G06K 9/00 (2006.01)
 G08G 1/16 (2006.01)
 B62D 6/00 (2006.01)
(52) U.S. Cl.
 CPC .............. *B60W 50/14* (2013.01); *B62D 6/00* (2013.01); *G06K 9/00798* (2013.01); *G06K 9/00825* (2013.01); *G08G 1/16* (2013.01); *B60W 2050/143* (2013.01); *B60W 2554/4041* (2020.02)

(56) References Cited

U.S. PATENT DOCUMENTS

| | | | | |
|---|---|---|---|---|
| 9,000,903 | B2* | 4/2015 | Bowers | G06Q 40/08 340/436 |
| 9,487,212 | B1* | 11/2016 | Adam | B60W 30/143 |
| 10,126,422 | B1* | 11/2018 | Obodo | G01S 13/931 |
| 2007/0080825 | A1* | 4/2007 | Shiller | G08G 1/166 340/903 |
| 2007/0197230 | A1* | 8/2007 | Roggero | H04B 7/088 455/456.1 |
| 2007/0268067 | A1* | 11/2007 | Bernhard | G08G 1/167 327/558 |
| 2011/0125350 | A1* | 5/2011 | Won | B61L 25/02 701/20 |
| 2012/0161982 | A1* | 6/2012 | Musachio | G08G 1/07 340/932 |
| 2013/0158800 | A1* | 6/2013 | Trageser | G08G 1/167 701/41 |
| 2013/0166150 | A1* | 6/2013 | Han | B60W 10/18 701/42 |
| 2013/0226408 | A1* | 8/2013 | Fung | B62D 6/007 701/41 |
| 2014/0149013 | A1 | 5/2014 | Matsuno | |
| 2015/0220793 | A1* | 8/2015 | Kiyohara | G06K 9/00791 382/103 |
| 2015/0232073 | A1* | 8/2015 | Fujishiro | B60T 7/22 701/70 |
| 2017/0076607 | A1* | 3/2017 | Linder | B60Q 1/346 |
| 2017/0113665 | A1* | 4/2017 | Mudalige | G08G 1/166 |
| 2017/0369055 | A1* | 12/2017 | Saigusa | G08G 1/0116 |
| 2018/0001952 | A1* | 1/2018 | Rajamani | B62J 3/00 |
| 2018/0048801 | A1* | 2/2018 | Kiser | H04N 5/2258 |
| 2018/0114078 | A1* | 4/2018 | Tokita | G08G 1/16 |
| 2018/0158337 | A1* | 6/2018 | Koravadi | B60W 50/14 |
| 2018/0217604 | A1* | 8/2018 | Nakajima | G08G 1/0969 |
| 2018/0357903 | A1* | 12/2018 | Fukunaga | B60W 40/04 |
| 2019/0164430 | A1* | 5/2019 | Nix | B60R 11/04 |
| 2020/0082722 | A1* | 3/2020 | Beiski | G01S 13/931 |
| 2021/0082297 | A1* | 3/2021 | Jacobus | G08G 1/163 |

FOREIGN PATENT DOCUMENTS

| | | |
|---|---|---|
| JP | 2010-44461 A | 2/2010 |
| JP | 2010-83314 A | 4/2010 |
| JP | 2010-97261 A | 4/2010 |

* cited by examiner

COLLISION AVOIDANCE DEVICE AND COLLISION AVOIDANCE METHOD FOR VEHICLE

CROSS-REFERENCE TO RELATED APPLICATION

The present application claims priority based on Japanese Patent Application No. 2016-242119, filed on Dec. 14, 2016, the contents of which are incorporated herein by reference in its entirety.

BACKGROUND

Technical Field

The present disclosure relates to a collision avoidance device for a vehicle and a collision avoidance method for a vehicle.

Background Art

In the technologies of avoiding an obstacle, a driver feels it to be burdensome if being notified of a possibility of collision with an object that he/she has already recognized, or if collision avoidance control is executed on such an object.

SUMMARY

The present disclosure provides a collision avoidance device for a vehicle. The collision avoidance device for the vehicle according to the first aspect includes an object sensing unit that senses an object, an attribute acquisition unit that uses a sensing result from the object sensing unit to acquire an attribute of an oncoming vehicle, and a collision avoidance execution unit that executes at least one of a notification of a possibility of collision and a collision avoidance operation, if it is determined, based on the attribute acquired by the attribute acquisition unit, that the oncoming vehicle crosses a center line.

BRIEF DESCRIPTION OF THE DRAWINGS

With the following detailed description and the attached drawings, the present disclosure will more fully be understood.

DETAILED DESCRIPTION OF THE PREFERRED EMBODIMENTS

Figure 1:
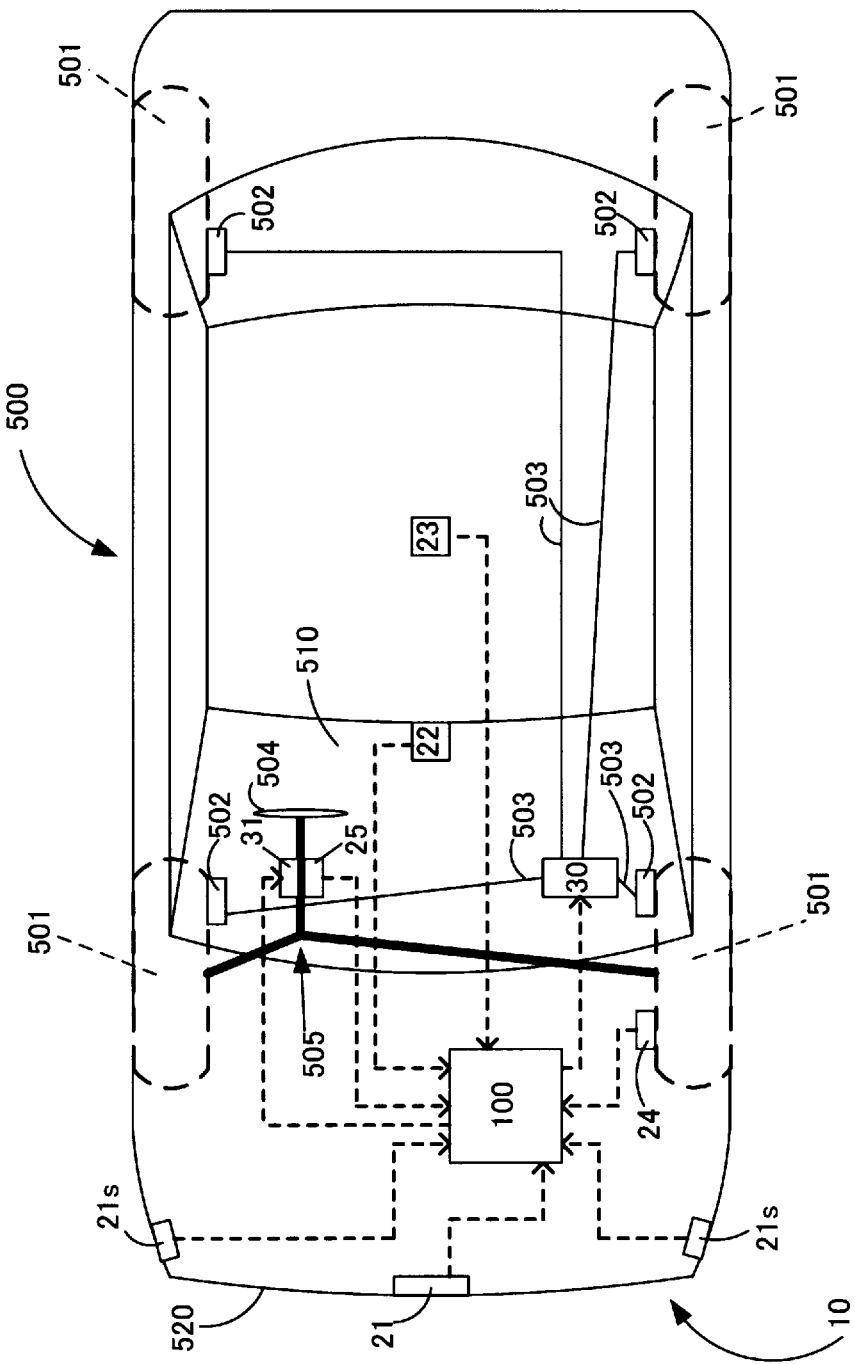
FIG. 1 is an explanatory diagram showing a vehicle on which a collision avoidance device according to a first embodiment is mounted.

The present disclosure particularly relates to a technology of controlling collision avoidance against an oncoming vehicle.

Technologies for using a sensing result from an object sensor such as a camera or a radar to avoid collision with an object such as another vehicle or an obstacle that exists in front of a host vehicle, have been commercialized. Therefore, a technology for notifying a driver of an object assumed not to be recognized by the driver, or for controlling collision avoidance against such an object has been proposed.

However, if an object against which the collision avoidance is executed is an oncoming vehicle, the oncoming vehicle is an object whose location varies dynamically and whose behavior is not easy to predict, which is problematic. Moreover, on the facing passage road, an oncoming vehicle relative to a host vehicle intermittently appears. Furthermore, collision avoidance against an oncoming vehicle involves steering control and/or braking control, so that a possibility of collision with an object other than the oncoming vehicle, such as another vehicle, and/or the influence on another vehicle, needs to be considered.

Therefore, executing collision avoidance against an oncoming vehicle if there is a high possibility of collision is desired.

The present disclosure can be implemented as the following aspects.

A first aspect provides a collision avoidance device for a vehicle. The collision avoidance device for the vehicle according to the first aspect includes an object sensing unit that senses an object, an attribute acquisition unit that uses a sensing result from the object sensing unit to acquire an attribute of an oncoming vehicle, and a collision avoidance execution unit that executes at least one of a notification of a possibility of collision and a collision avoidance operation, if it is determined, based on the attribute acquired by the attribute acquisition unit, that the oncoming vehicle crosses a center line.

The collision avoidance device for the vehicle according to the first aspect can execute collision avoidance against the oncoming vehicle if the possibility of collision is high.

A second aspect provides a collision avoidance method for a vehicle. The collision avoidance method for the vehicle according to the second aspect includes using a sensing result from an object sensing unit to acquire an attribute of an oncoming vehicle, and executing at least one of a notification of a possibility of collision and a collision avoidance operation, if it is determined, based on the attribute acquired by the attribute acquisition unit, that the oncoming vehicle crosses a center line.

The collision avoidance method for the vehicle according to the second aspect can execute collision avoidance against the oncoming vehicle if the possibility of collision is high. Notably, the present disclosure can also be implemented as a collision avoidance program for a vehicle, or a computer readable recording medium that records the program.

Based on some embodiments, hereinafter will be described a collision avoidance device for a vehicle and a collision avoidance method for a vehicle according to the present disclosure.

First Embodiment

As shown in FIG. 1, a collision avoidance device 10 according to a first embodiment is mounted on a vehicle 500. The collision avoidance device 10 includes a control device 100, millimeter wave radars 21, 21s, a monocular camera 22, a yaw rate sensor 23, a wheel velocity sensor 24, a steering angle sensor 25, a braking assistance actuator 30, and a steering assistance actuator 31. Notably, the braking assistance device 10 may include only the control device 100, and if including the millimeter wave radars 21, 21s, the monocular camera 22, the yaw rate sensor 23, the wheel velocity sensor 24, the steering angle sensor 25, the braking assistance actuator 30, and the steering assistance actuator 31, the braking assistance device 10 may be called a braking assistance system. The vehicle 500 includes wheels 501, braking devices 502, braking lines 503, a steering wheel 504, a windshield 510, and a front bumper 520. Notably, the vehicle only needs to include, as an object sensing unit, at least the monocular camera 22 in the millimeter wave radars 21, 21s, the monocular camera 22, and a LIDAR, i.e., a laser radar. In the present embodiment, the millimeter wave radars 21, 21s and the monocular camera 22 are included as the object sensing unit.

In the vehicle 500, each of the braking devices 502 is provided at the corresponding one of the wheels 501. Each of the braking devices 502 implements braking of the corresponding one of the wheels 501 by brake fluid pressure supplied via the braking lines 503 in accordance with a driver's braking pedal operation. Each braking line 503 includes a brake piston that derives brake fluid pressure in accordance with a braking pedal operation, and a brake fluid line. In the present embodiment, the braking assistance actuator 30 is provided for the braking lines 503, and can control fluid pressure independently of a braking pedal operation, thereby implementing braking assistance. Notably, Each braking line 503 may be configured such that the brake fluid line is replaced by a control signal line and an actuator provided at the corresponding one of the braking devices 502 is operated. The steering wheel 504 is connected to the front wheels 501 via a steering mechanism 505 that includes a steering rod. In the present embodiment, the steering assistance actuator 31 is provided at the steering mechanism 505, such as at the steering rod, and enables steering of the front wheels 501 independently of a driver's operation of the steering wheel 504, thereby implementing steering assistance.

Figure 2:
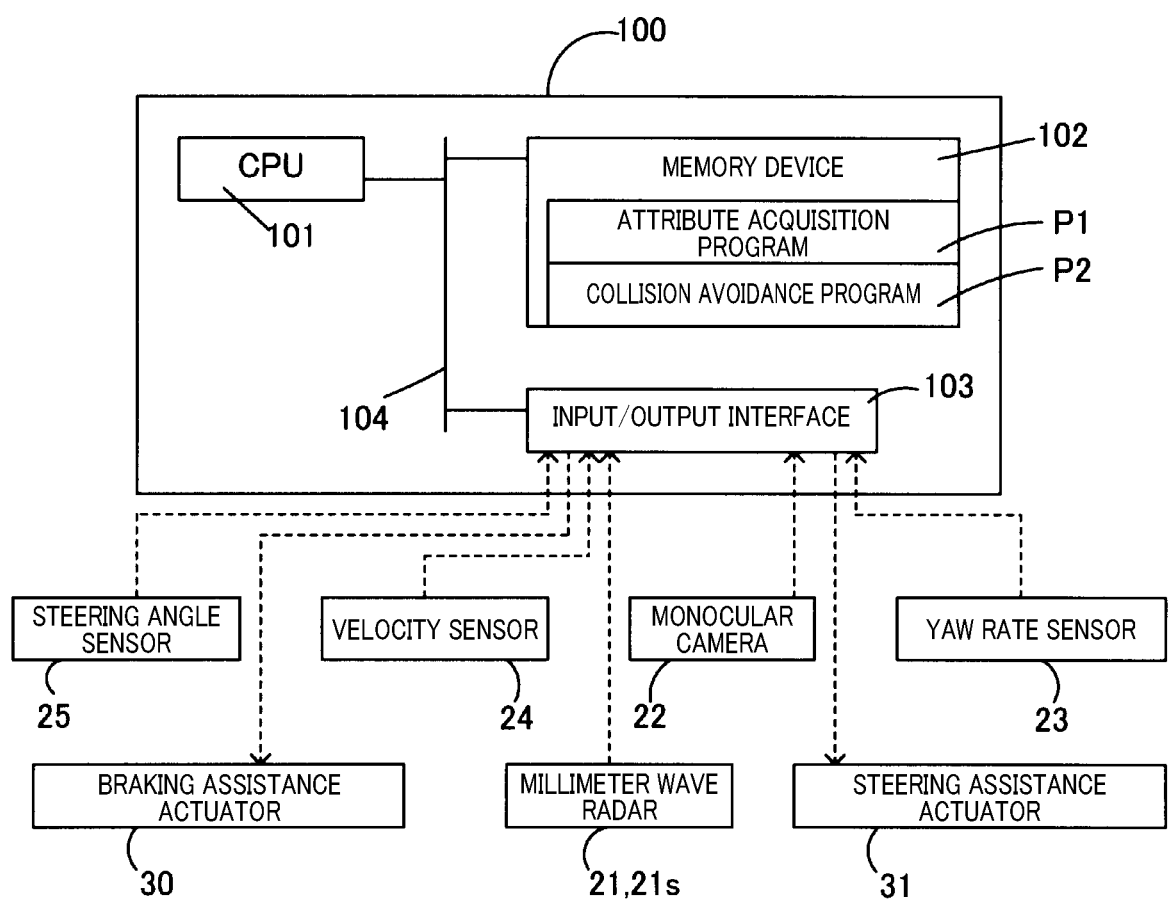
FIG. 2 is a block diagram showing a functional configuration of a control device included in the collision avoidance device according to the first embodiment.

As shown in FIG. 2, the control device 100 includes a central processing unit (CPU) 101, a memory device 102, an input/output interface 103, and a bus 104. The CPU 101, the memory device 102, and the input/output interface 103 are connected via the bus such that they can bidirectionally communicate with each other. The memory device 102 includes a memory that stores an attribute acquisition program P1 and a collision avoidance program P2 in a non-volatile and read-only manner, an example of which is a ROM, and a memory that is readable/writable by the CPU 101, an example of which is a RAM. The attribute acquisition program P1 is for acquiring an attribute of an oncoming vehicle, and the collision avoidance program P2 is for avoiding a collision by steering assistance provided by the steering mechanism 505 and braking assistance provided by the braking device 502. The CPU 101 decompresses and executes the attribute acquisition program P1, which is stored in the memory device 102, in the readable/writable memory to thereby function as an attribute acquisition unit, and similarly, executes the collision avoidance program P2 to thereby function as a collision avoidance execution unit. Notably, the collision avoidance execution unit also includes the steering assistance actuator 31 that receives a control signal from the CPU 101 and imparts, to the steering mechanism 505, a rotational torque for steering assistance, and the braking assistance actuator 30 that receives a control signal from the CPU 101 and applies, to each braking line 503, brake fluid pressure for braking assistance. Moreover, the collision avoidance execution unit can include a control unit implemented by the CPU 101, and a driving unit implemented by the braking assistance actuator 30 and the steering assistance actuator 31. The control unit executes the collision avoidance program P2 to control execution of collision avoidance, thus transmitting a control signal to each actuator. The driving unit drives the braking devices 502 and the steering mechanism 505 for collision avoidance. The CPU 101 may be a single CPU, a plurality of CPUs that respectively execute the programs, or a multitask-type CPU that can simultaneously execute a plurality of programs.

Respectively connected to the input/output interface 103 via control signal lines are the millimeter wave radars 21, 21s, the monocular camera 22, the yaw rate sensor 23, the wheel velocity sensor 24, the steering angle sensor 25, and the braking assistance actuator 30. The input/output interface 103 receives inputs of sensing information from the millimeter wave radars 21, 21s, the monocular camera 22, the yaw rate sensor 23, the wheel velocity sensor 24, and the steering angle sensor 25, and outputs a control signal indicating a braking level to the braking assistance actuator 30 and a control signal indicating a steering angle to the steering assistance actuator 31.

Each of the millimeter wave radars 21, 21s is a sensor that emits millimeter waves and receives reflected waves reflected by an object, to thereby detect a distance from, and a relative velocity and an angle of, the object. In the present embodiment, the millimeter wave radar 21 is disposed at the center of the front bumper 520, and the two millimeter wave radars 21s are respectively disposed at opposite side surfaces of the front bumper 520. Each of the millimeter wave radars 21, 21s can include a processing circuit that can process received waves. A detection signal outputted from each of the millimeter wave radars 21, 21s may be, for example, a signal comprised of dots obtained based on the processing of the received waves or the sequence of the dots. Each of the dots indicates a representative location of an object. The detection signal may also be, for example, a signal that indicates unprocessed received waves. If an unprocessed received wave is used as a detection signal, the control device 100 executes signal processing for specifying a location of and a distance from the object. Notably, the millimeter wave radars may be replaced by LIDARs.

The monocular camera 22, which is an imaging device that includes one imaging element such as a CCD, is a sensor that receives visible light to thereby output external shape information about an object as image data indicative of, which is a sensing result. The image data outputted from the monocular camera 22 is comprised of a plurality of time-sequentially consecutive frame images time-sequentially, and each frame image is represented by pixel data. In the present embodiment, the monocular camera 22 is disposed at the upper center of the windshield 510. The pixel data outputted from the monocular camera 22 is monochrome or colored pixel data. Notably, the monocular camera 22 may be replaced by a compound-eye stereo camera.

The yaw rate sensor 23 is a sensor that detects a rotational angular velocity of the vehicle 500. The yaw rate sensor 23 is disposed, for example, at a central portion of the vehicle. A detection signal outputted from the yaw rate sensor 23 represents a voltage value proportional to a rotational direction and an angular velocity.

The wheel velocity sensor 24 is a sensor provided at each wheel 501, detecting a rotational velocity of the corresponding wheel 501. A detection signal outputted from each wheel velocity sensor 24 represents a voltage value proportional to a wheel velocity or a pulsed wave indicating intervals in accordance with the wheel velocity. With use of the detection signal from the wheel velocity sensor 24, information on a velocity of the vehicle, a travelling distance of the vehicle, and the like can be acquired.

The steering angle sensor 25 is a torque sensor that detects a torsional amount that has occurred in the steering rod by steering of the steering wheel 504, i.e., steering torque. In the present embodiment, the steering angle sensor 25 is provided at the steering rod that connects the steering wheel 504 and the steering mechanism. A detection signal outputted from the steering angle sensor 25 represents a voltage value proportional to a torsional amount.

The braking assistance actuator 30 is an actuator that causes the braking devices 502 to execute braking irrespective of a braking pedal operation by an operator. Notably, the braking assistance actuator 30 houses a driver that controls an operation of the actuator based on a control signal from the CPU 101. In the present embodiment, the braking assistance actuator 30 is provided at the braking lines 503, and increases/decreases hydraulic pressure in each braking line 503 in accordance with a control signal from the control device 100. The braking assistance actuator 30 is configured with, for example, a module that includes an electric motor and a hydraulic piston driven by the electric motor. Alternatively, the braking assistance actuator 30 may be comprised of a braking control actuator that has already been introduced as a sideslip prevention device or an antilock braking system.

The steering assistance actuator 31 is an actuator for implementing steering by the steering mechanism 505 irrespective of an operation of the steering wheel 504 by an operator. Notably, the steering assistance actuator 31 houses a driver that controls an operation of the actuator based on a control signal from the CPU 101. In the present embodiment, the steering assistance actuator 31 is provided at the steering rod or a rack and pinion gear portion included in the steering mechanism 505, and changes a steering angle provided by the steering mechanism 505, in accordance with a control signal from the control device 100. The steering assistance actuator 31 is configured with, for example, a module that includes an electric motor and a decelerator. This module may be newly installed in the steering mechanism 505 that includes a hydraulic power steering. Alternatively, a role of this module may be played by a module that includes an electric motor and a decelerator, which module has already been introduced as an actuator for an electric power steering.

Figure 3:
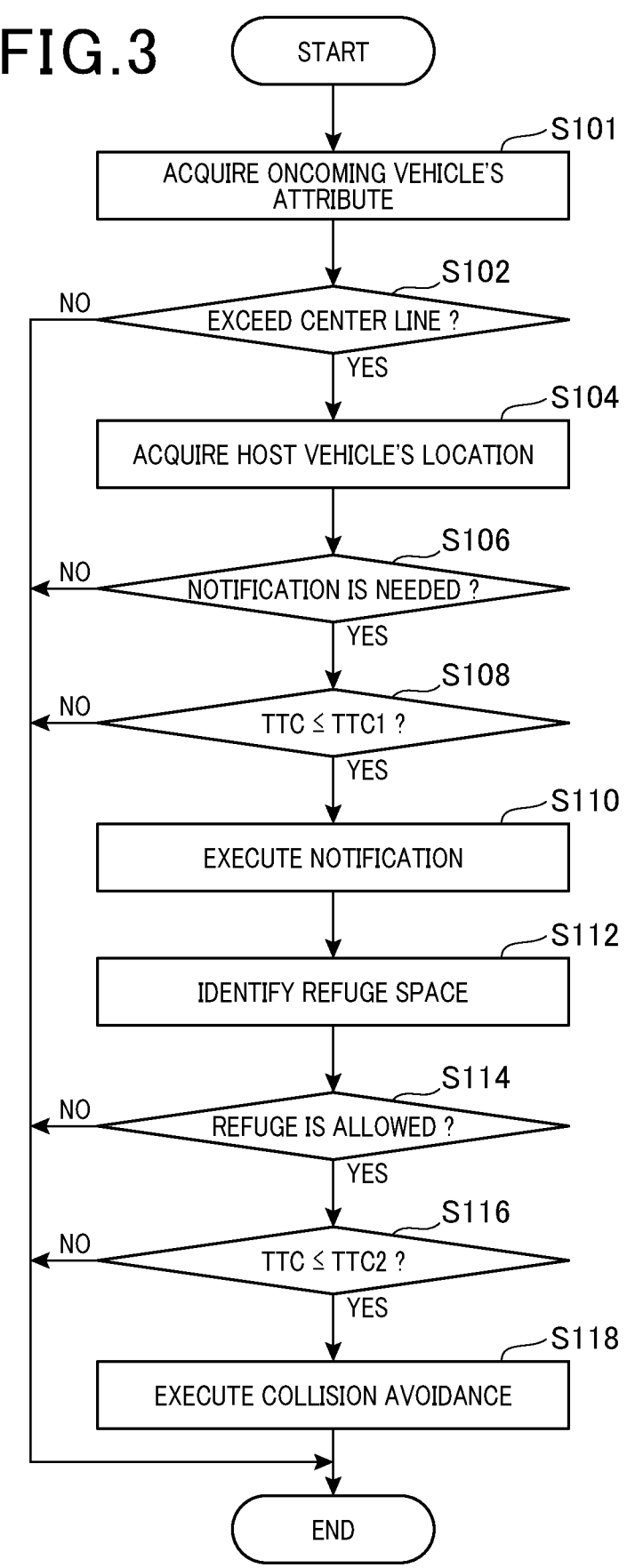
FIG. 3 is a flowchart showing a process flow for avoiding collision with an oncoming vehicle, executed by the collision avoidance device according to the first embodiment.

A collision avoidance process executed by the collision avoidance device 10 according to the first embodiment will be described hereinafter with reference to FIGS. 3 to 7. The processing routine shown in FIG. 3 is repeatedly executed at predetermined time intervals, for example, from startup to stop of a control system of the vehicle or from turn-on to turn-off of a start switch, by the CPU 101's executing the attribute acquisition program P1 and the collision avoidance program P2. Description will hereinafter be made with the circumstance shown in FIG. 4 taken as an example. Notably, the attribute acquisition program P1 and the collision avoidance program P2 may be separate processing routines activated at different timings. For example, the attribute acquisition program P1, which acquires attributes of oncoming vehicles M2, M3, may be continuously executed while the host vehicle M1 is activated or is in a travelable state, and the collision avoidance program P2 may be executed using, as a trigger, the determination that the oncoming vehicles M2, M3 exceed a center line CL toward a host vehicle's lane.

Figure 4:
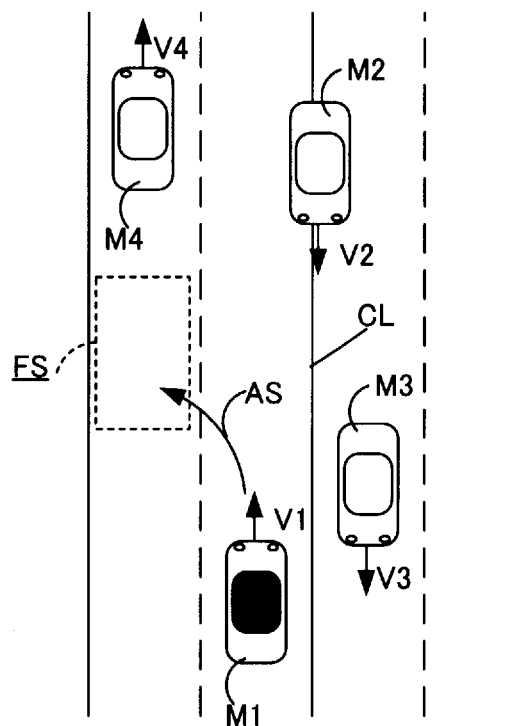
FIG. 4 is an explanatory diagram schematically showing a first exemplary positional relation between a host vehicle and an oncoming vehicle in execution of a collision avoidance process in the first embodiment.

In the circumstance shown in FIG. 4, the CPU 101 acquires attributes of the oncoming vehicles M2, M3 (step S100). In the present embodiment, the oncoming vehicles M2, M3 mean vehicles that are proceeding in a manner opposed to the host vehicle M1. The CPU 101 uses sensing results from the millimeter wave radars 21, 21s to calculate and acquire, for example, a distance from the host vehicle M1 to each of the oncoming vehicles M2, M3, a relative velocity of each of the oncoming vehicles M2, M3 with respect to the host vehicle M1, orientations of the oncoming vehicles M2, M3, an overlap ratio between the host vehicle M1 and each of the oncoming vehicles M2, M3, and a predicted time-to-collision (TTC) required for the host vehicle M1 to collide with each of the oncoming vehicles M2, M3, as attribute information of the oncoming vehicles M2, M3. Moreover, the CPU 101 uses image data from the monocular camera 22 to calculate and acquire, for example, external dimensions of the other vehicles M2, M3, relative locations of the oncoming vehicles M2, M3 with respect to the host vehicle M1, and locations of the oncoming vehicles M2, M3 relative to the center line, as attribute information of the oncoming vehicles M2, M3. Notably, the orientations of the oncoming vehicles M2, M3 and the overlap ratio between the host vehicle M1 and each of the oncoming vehicles M2, M3 can be determined with improved accuracy by using sensing results from the millimeter wave radars 21, 21s and image data from the monocular camera to execute a data fusion process. The overlap ratio means a ratio of overlap between a lateral width of the host vehicle M1 and each of the oncoming vehicles M2, M3 in their width directions, i.e., in their lateral directions.

The orientation of each of the oncoming vehicles M2, M3 is specified as follows, for example. The CPU 101 uses detection points that are sensing results inputted from the millimeter wave radars 21, 21s, and lateral width dimensions of a vehicle front surface in accordance with distances from the host vehicle M1, which lateral width dimensions are prepared in advance, to specify coordinate values corresponding to the vehicle front surface. If there are detection points that exist at a coordinate location beyond the lateral width of the specified vehicle front surface and correspond to a vehicle side surface, the CPU 101 specifies a detection point whose coordinate value in a longitudinal direction, i.e., in a proceeding direction of the host vehicle M1, is less than a coordinate value corresponding to a dimension of the entire length of the vehicle and prepared in advance. In the present embodiment, unless otherwise specified, the direction parallel to a lane is called a longitudinal direction, and the direction perpendicular to the lane is called a lateral direction. The CPU 101 determines a line obtained by connecting a coordinate value of an end point of the lateral width of the vehicle front surface and a coordinate value of the detection point corresponding to the vehicle side surface, determines a inclination of the line, and specifies the orientation of each of the oncoming vehicles M2, M3 from the inclination. Alternatively, the CPU 101 may superpose, through a data fusion process, the coordinate locations of respective detection points inputted from the millimeter wave radars 21, 21s onto a front surface region and a side surface region of the vehicle extracted from the image data inputted from the monocular camera 22, use coordinate values of the respective detection points, and specify the orientation of each of the oncoming vehicles M2, M3.

If the millimeter wave radars 21, 21s have a high resolution, and a plurality of detection points representing an object is outputted as a dot sequence, the dot sequence may be used to specify the orientation of each of the oncoming vehicles M2, M3, as in the above-described approach. Furthermore, the orientations of the oncoming vehicles M2, M3 may be respectively determined from inclinations of the vehicle front surfaces of the oncoming vehicles M2, M3 relative to the center line CL. The center line CL can be specified with an approach mentioned below. The coordinates representing a line in the width direction of the vehicle front surface of each of the oncoming vehicles M2, M3 can be specified using the coordinate values of the dot sequence, as has already been mentioned.

Figure 5:
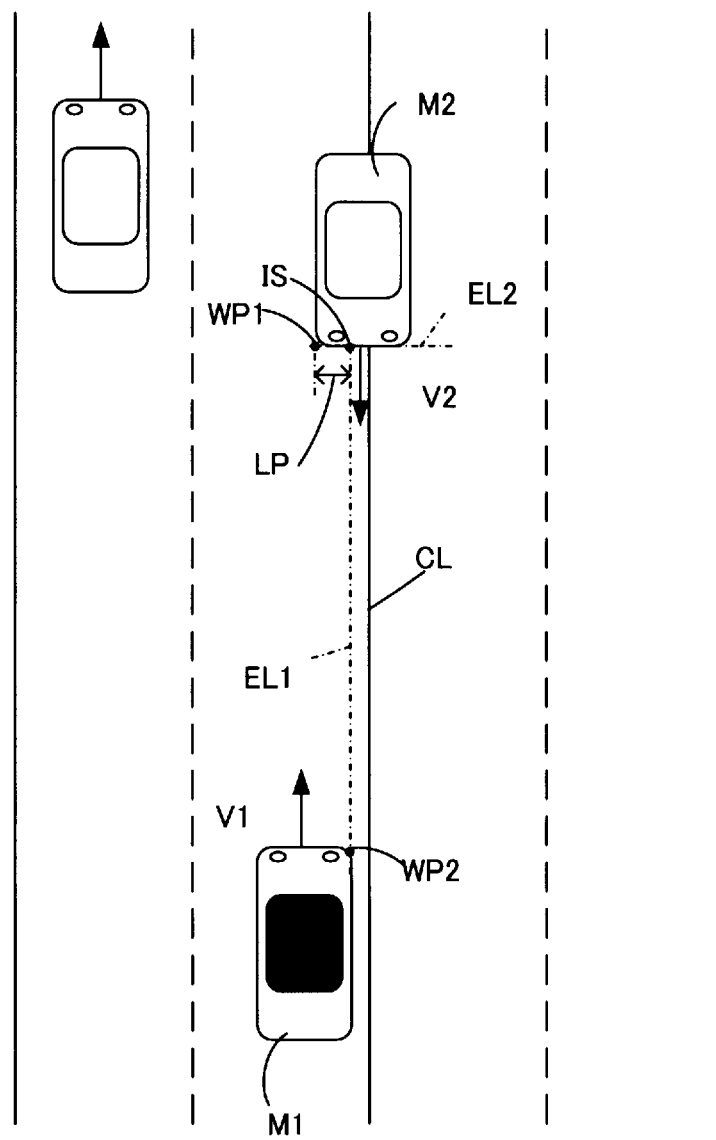
FIG. 5 is an explanatory diagram schematically showing a positional relation between the host vehicle and the oncoming vehicle in obtainment of an overlap ratio between the host vehicle and the oncoming vehicle in the first embodiment.

How to calculate an overlap ratio between the host vehicle M1 and each of the oncoming vehicles M2, M3 will be described with FIG. 5 taken as an example. The CPU 101 uses, detection points corresponding to the vehicle front surface or a dot sequence including dots arranged in the width direction, which points or dot sequence are(is) inputted from the millimeter wave radars 21, 21s, and lateral width dimensions of the vehicle front surface in accordance with distances from the host vehicle M1, using dimensions prepared in advance, to specify coordinates of a closest end portion WP1 of each of the oncoming vehicles M2, M3. The closest end portions WP1 of the oncoming vehicles M2, M3 respectively refer to end portions of the oncoming vehicles M2, M3 located at the shortest distances from the host vehicle M1. The closest end portions WP1 of the oncoming vehicles M2, M3 are their right front end portions in the case of left-hand traffic, and are their left front end portions in the case of right-hand traffic. Notably, for simplicity's sake, the description will hereinafter be made with the left-hand traffic taken as an example. The CPU 101 obtains a coordinate value of an intersection point IS between an extension line EL1 and an extension line EL2. The extension line EL1 is an extension from a closest end portion WP2 of the host vehicle M1 toward each of the oncoming vehicles M2, M3. The extension line EL2 is an extension in a width direction along the front surface of each of the oncoming vehicles M2, M3. The CPU 101 then calculates a difference LP in the width direction between the obtained coordinate value of the intersection point IS and the coordinate value of the closest end portion WP, calculates a ratio of overlap between a dimension of the calculated coordinate value difference in the width direction and a width dimension of the host vehicle M1, and acquires a overlap ratio.

The CPU 101 further continuously monitors behaviors of the oncoming vehicles M2, M3, and sets an obstacle avoidance history flag as attribute information. The obstacle avoidance history flag is set to on, i.e. to information about an obstructing-vehicle avoidance, if the following two events are recorded: an event in which the oncoming vehicle M2 exists behind or diagonally behind a vehicle at rest on the opposing lane or the oncoming vehicle M3 that precedes the oncoming vehicle M2; and an event in which the oncoming vehicle M2 tries to pass the vehicle at rest or the oncoming vehicle M3 (hereinafter also called an "obstructing vehicle").

Whenever each event occurs, the CPU 101 records it in the memory device 102, and if both of the events are recorded, the CPU 101 turns the obstacle avoidance history flag on.

The event in which the oncoming vehicle M2 exists behind or diagonally behind the obstructing vehicle M3 is recorded, if sensing results continuously inputted from the millimeter wave radars 21, 21s are used to sense that location coordinates of the oncoming vehicle M2 exist behind or diagonally behind the location coordinates of the obstructing vehicle M3.

The event in which the oncoming vehicle M2 tries to pass the obstructing vehicle M3 is recorded, if sensing results continuously inputted from the millimeter wave radars 21, 21s are used to sense that the location coordinates of the oncoming vehicle M2 are located beside the location coordinates of the obstructing vehicle M3, or that the oncoming vehicle M2 has a lateral velocity, and has a ground speed V2 (km/h) in its longitudinal direction higher than a ground speed V3 (km/h) of the obstructing vehicle M3 in its longitudinal direction. Chronological recording of each event enables a history of each event to be acquired.

If any one of the following conditions (i) to (iii) are satisfied, the CPU 101 sets the obstacle avoidance history flag to off, i.e. to information about an obstructing-vehicle non-avoidance.

(i) |Oncoming vehicle's lateral location|≥|Obstructing vehicle's lateral location|−α

If the oncoming vehicle turns to cross the host vehicle's lane, i.e., makes a right turn, no oncoming vehicle to be monitored exists, and hence the obstacle avoidance history flag is turned off. Notably, in the above-described expression, each lateral location is a coordinate value of the corresponding vehicle in its lateral direction, and means a coordinate value of the closest end relative to the host vehicle, and a is, for example, a value corresponding to a width dimension of one lane.

(ii) The oncoming vehicle and the obstructing vehicle are in the same lane.

In this case, the oncoming vehicle has already passed the obstructing vehicle and is in the opposing lane, or given up passing the obstructing vehicle and is in the opposing lane, so that it can be considered that a possibility of collision decreases and the need for collision avoidance is eliminated.

(iii) Obstacle Avoidance History Recorded continues for at least a certain period.

When at least a certain period, i.e., at least a time-out period elapses from the determination of Obstacle Avoidance History Recorded, the information on obstacle avoidance of the oncoming vehicle becomes obsolete and reliability decreases. Therefore, when at least a certain period elapses from the turn-on of the obstacle avoidance history flag, the obstacle avoidance history flag is cleared.

The CPU 101 uses the acquired attribute information to determine whether each of the oncoming vehicles M2, M3 exceeds or crosses the center line CL toward the host vehicle's lane (step S102). Specifically, the CPU 101 uses a pattern matching method to extract a pixel region corresponding to the center line CL and pixel regions respectively corresponding to the oncoming vehicles M2, M3 from the image data inputted from the monocular camera 22, and uses location coordinates of the extracted pixel regions respectively corresponding to the oncoming vehicles M2, M3 and location coordinates of the extracted pixel region corresponding to the center line CL, to determine whether each of the oncoming vehicles M2, M3 exceeds the center line CL.

In the example in FIG. 4, the oncoming vehicle M2 exceeds the center line CL, and the CPU 101 determines that the oncoming vehicle M2 exceeds the center line CL (step S102: Yes), and moves to step S104. On the other hand, if no oncoming vehicle exceeds the center line CL (step S102: No), the CPU 101 terminates the present processing routine.

Figure 7:
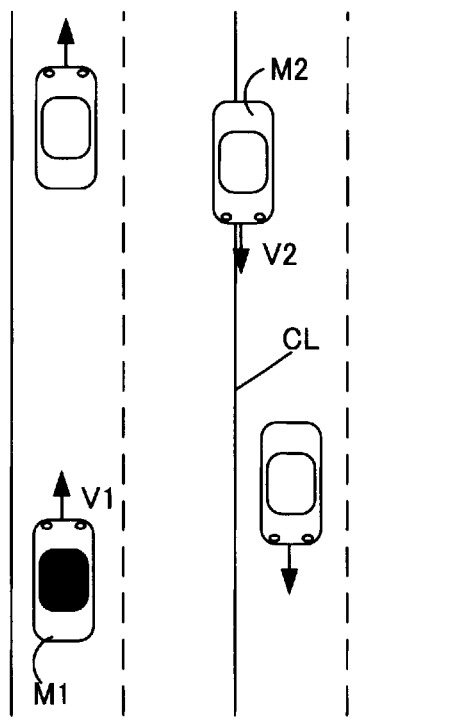
FIG. 7 is an explanatory diagram schematically showing a third exemplary positional relation between the host vehicle and the oncoming vehicle in execution of the collision avoidance process in the first embodiment.

At step S104, the CPU 101 acquires a location of the host vehicle M1. Specifically, the CPU 101 extracts the center line CL from image data inputted from the monocular camera 22, and acquires the location of the host vehicle M1 relative to the center line CL. The location of the host vehicle M1 relative to the center line CL means two situations, i.e., a situation in which the host vehicle M1 is traveling in a lane adjacent to the center line CL, as shown in FIG. 4, or a situation in which the host vehicle M1 is traveling in a lane not adjacent to the center line CL, as shown in FIG. 7. If the host vehicle M1 is traveling on a one-lane road, the host vehicle M1 necessarily travels in a lane adjacent to the center line CL. On the other hand, if the host vehicle M1 is traveling on an at least two-lane road, the host vehicle M1 travels in a lane adjacent to, or not adjacent to, the center line CL. Furthermore, the host vehicle M1's traveling in a lane adjacent to the center line CL means that the center line CL is a line on the right of the host vehicle M1 in the case of left-hand traffic, and is a line on the left of the host vehicle M1 in the case of right-hand traffic.

The CPU 101 uses the attribute information on the oncoming vehicle M2 and the location of the host vehicle M1 to determine whether a notification of collision avoidance is needed (step S106). If at least one of the following conditions is satisfied, the CPU 101 determines that the notification is needed.

(1) The host vehicle M1 is traveling in a lane adjacent to the center line CL.

(2) The oncoming vehicle M2 is traveling straight.

(3) The oncoming vehicle M2 has an obstacle avoidance history.

(4) The overlap ratio between the host vehicle M1 and the oncoming vehicle M2 falls within a predetermined range.

Notably, the conditions (2) to (4) may be determined at a higher priority, and consideration of the condition (1) can further reduce execution of collision avoidance in the case of a low possibility of collision. Moreover, as more conditions are determined, the possibility of collision can be determined as higher.

The condition (1) is determined based on the location of the host vehicle M1 acquired at step S104. The condition (2) is determined based on the orientation of the oncoming vehicle M2. The condition (3) is determined based on the obstacle avoidance history flag. The range prepared in advance in the condition (4) is, for example, 0 to 50%, more preferably 30 to 50%. If the overlap ratio obtained when the attribute of the oncoming vehicle is acquired falls within these ranges prepared in advance, the condition (4) is satisfied. Notably, the overlap ratio is ensured to have an upper limit of 50%. This is because an aspect of collision to be avoided by steering assistance is the so-called offset collision, which tends to cause greater damage to a vehicle because an impact caused by this collision acts on the vehicle unevenly. In the case of the full-lap collision which has an overlap ratio exceeding 50%, its impact can be received by the entire vehicle, and execution of collision avoidance by steering assistance would invite offset collision instead, which needs to be avoided.

If determining that even any one of the conditions (1) to (4) is not satisfied (step S106: No), the CPU 101 terminates the present processing routine. If determining that the conditions (1) to (4) are satisfied (step S106: Yes), the CPU 101 determines whether the predicted time-to-collision TTC(s) is equal to or less than a determination time-requiring-notification TTC1(s) (step S108). If determining that TTC>TTC1 (step S108: No), the CPU 101 terminates the present processing routine. If there is a sufficient time before avoidance of collision between the host vehicle M1 and the oncoming vehicle M2, i.e., if there is a time at least longer than TTC1, a notification is not executed, and a voluntary avoidance by the operator is awaited. If determining that TTC TTC1 (step S108: Yes), the CPU 101 executes a notification to promote collision avoidance (step S110). The notification can be executed by at least one of sound and display on a meter panel or the windshield 510. Additionally, a notification such as vibrating the steering wheel 504 may also be executed.

Figure 6:
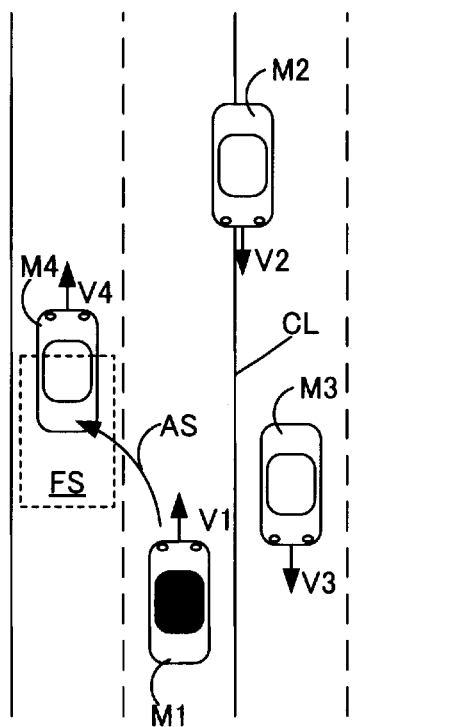
FIG. 6 is an explanatory diagram schematically showing a second exemplary positional relation between the host vehicle and the oncoming vehicle in execution of the collision avoidance process in the first embodiment.

The CPU 101 uses sensing results from the millimeter wave radars 21, 21s and image data from the monocular camera 22 to acquire a road environment in a lane located along a direction in which the host vehicle M1 moves apart from the center line CL, and identifies a refuge space for allowing the host vehicle M1 to avoid collision with the oncoming vehicle M2 (step S112). Notably, the identifying means specifies and detects the presence of a refuge space. Specifically, the CPU 101 determines whether the image data from the monocular camera 22 contains a pixel region that indicates a certain object that exists in an assumed refuge region predetermined on the road on the left of the host vehicle M1, i.e., whether an empty space can be sensed. The CPU 101 mainly uses a sensing result from the millimeter wave radar 21s to determine whether an object exists in the assumed refuge region, i.e., whether effective millimeter wave reflection points that indicate a manhole or a structural object on/above the road are detected. If using image data from the monocular camera 22 to determine that the assumed refuge region contains a pixel region that indicates a certain object, the CPU 101 uses the millimeter wave radar 21s to determine a distance to a coordinate location corresponding to the pixel region that indicates the object in the assumed refuge region. If, using a sensing result and image data from the millimeter wave radar 21s and the monocular camera 22, as shown in FIG. 4, it is found that no object exists in the left lane or lane shoulder relative to the host vehicle M1, the CPU 101 determines that there is a refuge space FS capable of advancing the host vehicle M1 to the left forward (a track AS). Additionally, the CPU 101 may obtain a distance to the coordinate location corresponding to the pixel region that indicates the object in the assumed refuge region and a relative velocity between the object and the host vehicle M1, to determine whether the host vehicle M1 can be advanced to left forward (the track AS) without colliding against the object. For example, as shown in FIG. 6, even in the case where another vehicle M4 exists in a shoulder-side lane on a two-lane road, if the host vehicle M1 has a velocity V1 per hour and the other vehicle M4 has a velocity V3 per hour, and a relative velocity (V3−V1) with respect to the host vehicle is 0 km/h or more, then there is a refuge space FS capable of changing the course of the host vehicle M1 to left forward (the track AS) without colliding against the other vehicle M4. Furthermore, even in the case where the object has a relative velocity less than 0 km/h, if the object is located at a distance that the host vehicle M1 can stop by braking assistance without colliding against the object, there is a refuge space FS capable of changing the course of the host vehicle M1 to left forward.

The CPU 101 determines whether the host vehicle M1 can refuge to a refuge space FS, i.e., whether there is a refuge space FS (step S114). If determining that the host vehicle M1 will fail to refuge to a refuge space FS (step S114: No), the CPU 101 terminates the present processing routine. Execution of collision avoidance is to avoid causing collision with an object including another vehicle. Notably, the CPU 101 may determine the following conditions again.

(1) The host vehicle M1 is traveling in a lane adjacent to the center line CL.

(2) The oncoming vehicle M2 is traveling straight.

(3) The oncoming vehicle M2 has an obstacle avoidance history.

(4) The overlap ratio between the host vehicle M1 and the oncoming vehicle M2 falls within a predetermined range.

If determining that the host vehicle M1 can refuge to a refuge space FS (step S114: Yes), the CPU 101 determines whether the predicted time-to-collision TTC(s) is equal to or less than a determination time-requiring-collision-avoidance TTC2(s) (step S116). If determining that TTC>TTC2 (step S116: No), the CPU 101 terminates the present processing routine. If there is a sufficient time before avoidance of collision between the host vehicle M1 and the oncoming vehicle M2, i.e., if there is a time at least longer than TTC2, collision avoidance is not executed, and a voluntary avoidance by the operator is awaited. If determining that TTC TTC2 (step S116: Yes), the CPU 101 executes collision avoidance (step S118), and terminates the present processing routine. The collision avoidance is executed by, for example, changing a course of the host vehicle M1 to follow the track AS in FIGS. 4 and 6. The CPU 101 decides a steering angle for changing the course to the refuge space FS, and transmits to the steering assistance actuator 31 a control signal indicating the decided steering angle. The steering assistance actuator 31 operates the steering mechanism 505 to implement the decided steering angle, and directs the host vehicle M1 leftward. Furthermore, if collision avoidance is to be executed under the traffic environment in which an object exists left forward relative to the host vehicle M1, the braking assistance with use of the braking assistance actuator 30 may be executed simultaneously. An amount of the braking assistance is decided by the CPU 101 in accordance with a distance and a relative velocity between the host vehicle M1 and the object located left forward relative to the host vehicle M1.

When the lane is to be changed left forward, whether a following vehicle exists behind the vehicle may further be determined. If the lane change can be made without inviting contact with the following vehicle, the CPU 101 may determine that the host vehicle M1 can refuge to a refuge space FS. To sense the following vehicle, sensing signals from, for example, millimeter wave radars provided at sides of a vehicle rear bumper, and an ultrasonic sensor provided at the vehicle rear bumper as a parking sensor can be used.

The collision avoidance device 10 and the collision avoidance method according to the first embodiment as described above, enables at least one of a notification of a possibility of collision and a collision avoidance operation to be executed if the oncoming vehicles M2, M3 are found to exceed the center line based on attributes of the oncoming vehicles M2, M3, executing collision avoidance if there is a high possibility of collision with the oncoming vehicles M2, M3. In other words, whether collision avoidance is needed can be determined with an improved accuracy, and execution of unnecessary collision avoidance can be reduced. A combination of the millimeter wave radars 21, 21s and the monocular camera 22, in particular, tends to achieve a higher accuracy in sensing the presence of an object than in sensing the absence of an object. Therefore, executing collision avoidance if the oncoming vehicles M2, M3 exceed the center line, i.e., if there is a high possibility of collision with the oncoming vehicles M2, M3, is particularly desired.

Additionally, in the first embodiment, the collision avoidance operation is executed in the case (1) where the host vehicle M1 is traveling in a lane adjacent to the center line CL, and there is a possibility of collision with the oncoming vehicle M2 that exceeds the center line CL and moves toward the host vehicle M1, and in the case (2) where the oncoming vehicle M2 is traveling straight and highly possibly collides against the host vehicle M1 if it keeps exceeding the center line CL. Therefore, an accuracy of a determination of necessity of the collision avoidance, i.e., an accuracy of the circumstance which has a high possibility of collision with the oncoming vehicles M2, M3 can be improved.

If an object against which the collision avoidance is executed is the oncoming vehicles M2, M3, the oncoming vehicles M2, M3 are objects whose locations vary dynamically and whose behaviors are not easy to predict. In the first embodiment, behaviors of the oncoming vehicles M2, M3 are monitored by linking obstacle avoidance histories, so that whether the oncoming vehicles M2, M3 are the oncoming vehicle M2 that tends to exceed the center line CL can be determined. Moreover, on the facing passage road without a median strip, the oncoming vehicles M2, M3 relative to the host vehicle M1 intermittently appear. In the first embodiment, collision avoidance is only targeted for the oncoming vehicle M2 that exceeds the center line CL, and exceeding the center line CL is used as a trigger for executing the collision avoidance process. Therefore, unnecessary collision avoidance can be avoided, i.e., the collision avoidance assistance can be executed if collision avoidance is really needed. Furthermore, collision avoidance against the oncoming vehicle M2 involves steering control or braking control, so that a possibility of collision with an object other than an oncoming vehicle, such as the other vehicle M4 proceeding in front of the host vehicle M1, or an influence on another vehicle proceeding behind the host vehicle M1 needs to be considered. In the first embodiment, a behavior of the other vehicle M4 proceeding in front of the host vehicle M1, such as a relative velocity based on a ground speed, is set as a condition for starting execution of the collision avoidance process, so that collision with the other vehicle M4 does not occur. Moreover, for the other vehicle proceeding behind the host vehicle M1, a behavior of the other vehicle is sensed, and in a situation where the host vehicle M1 may collide against the other vehicle, the collision avoidance process is not executed to thereby prevent collision with the other vehicle.

Variations (1) In the above-described first embodiment, at least the monocular camera 22 is included as the object sensing unit. However, inclusion of at least an object sensing unit that can identify the center line CL is only required. For example, if a LIDAR has an improved resolution and achieves an ability to identify the center line CL, inclusion of the LIDAR is only required. Alternatively, inclusion of a stereo camera is only required.

(2) In the first embodiment, the attribute of the oncoming vehicle M2 is determined using a sensing signal or image data from the millimeter wave radars 21, 21s, the monocular camera 22, or a LIDAR and a stereo camera, serving as the object sensing unit. In contrast to this, the attribute of the oncoming vehicle M2 may also be determined using data on a behavior of another vehicle, which is acquired via an inter-vehicle communication system, such as a steering angle, an accelerator opening, and an operated amount of a brake.

(3) In the first embodiment, notification and execution of collision avoidance are successively performed. However, only the notification of collision avoidance or only the execution of collision avoidance may be performed. In any case, if there is a high possibility of collision with the oncoming vehicle M2, notification or execution of collision avoidance can be performed, so that execution of processes relating to unnecessary collision avoidance can be reduced.

(4) In the first embodiment, the CPU 101 executes the attribute acquisition program P1 and the collision avoidance program P2, to thereby implement the attribute acquisition unit and the collision avoidance execution unit in software. However, these units may be implemented in hardware by an integrated circuit or a discrete circuit programmed in advance.

The present disclosure has been described based on the embodiments and variations. The above-described embodiments of the invention, however, are intended to facilitate understanding of the present disclosure, and do not limit the present disclosure. The present disclosure can be modified and improved without departing from its gist and the scope of the claims, and additionally, includes equivalents thereof. For example, the technological features in the embodiments and the variations, respectively corresponding to the technological features in the aspects described in the section of Summary of the Invention, can be replaced or combined as appropriate, so as to solve some or all of the above-mentioned problems or achieve some or all of the above-mentioned effects. Moreover, if the technological features are not described as essential in the present specification, these features can be deleted as appropriate. For example, the collision avoidance device for the vehicle, according to the first aspect described above, is set as application 1.

Application 2: in the collision avoidance device for the vehicle according to application 2, if the attribute that has been acquired indicates at least one of the following conditions, the collision avoidance execution unit executes at least one of the notification of a possibility of collision and the collision avoidance operation:

(1) the oncoming vehicle has an avoidance history indicating that the oncoming vehicle has approached or has crossed the center line, (2) an overlap ratio between the oncoming vehicle and a host vehicle falls within a predetermined range, and (3) the oncoming vehicle is traveling straight to the host vehicle.

Application 3: in the collision avoidance device for the vehicle according to application 1 or 2, the collision avoidance execution unit executes at least one of the notification of a possibility of collision and the collision avoidance operation if the host vehicle is traveling along the center line.

Application 4: in the collision avoidance device for the vehicle according to any one of applications 1 to 3, the collision avoidance execution unit executes the collision avoidance operation after the notification of a possibility of collision.

Application 5: in the collision avoidance device for the vehicle according to application 4, the collision avoidance execution unit executes the collision avoidance operation for causing the host vehicle to refuge to a refuge space upon identifying, based on the sensing result from the object sensing unit.

Application 6: in the collision avoidance device for the vehicle according to any one of applications 1 to 5, the object sensing unit is a combination of a monocular imaging device and a radar or a LIDAR.

Application 7: in the collision avoidance device for the vehicle according to application 6, if the monocular imaging device detects an empty space in a traveling lane of the host vehicle, and the at least one of the radar or the LIDAR detects no effective millimeter wave reflection points, the collision avoidance execution unit identifies the empty spade as a refuge space.

Application 8: in the collision avoidance device for the vehicle according to any one of applications 1 to 7, the collision avoidance operation executed by the collision avoidance execution unit includes an avoidance operation via a steering unit.

Application 9: in the collision avoidance device for the vehicle according to application 8, the collision avoidance operation executed by the collision avoidance execution unit further includes braking assistance via a braking unit.

The invention claimed is:

1. A collision avoidance device for a vehicle, comprising:
   an object sensing unit configured to sense an object;
   an attribute acquisition unit configured to use a sensing result from the object sensing unit to acquire an attribute of an oncoming vehicle; and
   a collision avoidance execution unit configured to:
   determine whether the oncoming vehicle crosses a center line, based on the attribute of the oncoming vehicle acquired by the attribute acquisition unit;
   determine whether at least one of the following conditions included in the attribute of the oncoming vehicle is satisfied, in response to determining that the oncoming vehicle crosses the center line,
      (1) the vehicle is traveling in a lane adjacent to the center line;
      (2) the oncoming vehicle is traveling straight,
      (3) the oncoming vehicle has an obstacle avoidance history; and
      (4) an overlap ratio between the vehicle and the oncoming vehicle falls within a predetermined range; and
   perform at least one of a notification of a possibility of collision and a collision avoidance operation, in response to determining that at least one of the above conditions is satisfied.

2. The collision avoidance device for the vehicle according to claim 1, wherein
   the collision avoidance execution unit executes the at least one of the notification of the possibility of collision and a collision avoidance operation if the acquired attribute indicates at least one of first to third conditions,
   the first condition representing that the oncoming vehicle has an avoidance history indicating that the oncoming vehicle has approached or has crossed the center line,
   the second condition representing that an overlap ratio between the oncoming vehicle and the vehicle falls within a predetermined range, and
   the third condition representing that the oncoming vehicle is traveling straight to the vehicle.

3. The collision avoidance device for the vehicle according to claim 1, wherein
   the collision avoidance execution unit executes at least one of the notification of a possibility of collision and the collision avoidance operation if the vehicle is traveling along the center line.

4. The collision avoidance device for the vehicle according to claim 1, wherein
the collision avoidance execution unit executes the collision avoidance operation after the notification of a possibility of collision.

5. The collision avoidance device for the vehicle according to claim 4, wherein
the collision avoidance execution unit executes the collision avoidance operation for causing the vehicle to refuge to a refuge space upon identifying, based on the sensing result from the object sensing unit.

6. The collision avoidance device for the vehicle according to claim 1, wherein
the object sensing unit comprises a combination of a monocular imaging device and at least one of a radar or a LIDAR.

7. The collision avoidance device for the vehicle according to claim 6, wherein, if the monocular imaging device detects an empty space in a traveling lane of the vehicle, and the at least one of the radar or the LIDAR detects no effective millimeter wave reflection points, the collision avoidance execution unit identifies the empty space as a refuge space.

8. The collision avoidance device for the vehicle according to claim 1, wherein
the collision avoidance operation executed by the collision avoidance execution unit includes an avoidance operation via a steering unit.

9. The collision avoidance device for the vehicle according to claim 8, wherein
the collision avoidance operation executed by the collision avoidance execution unit further includes braking assistance via a braking unit.

10. A collision avoidance method for a vehicle, comprising:
acquiring an attribute of an oncoming vehicle based on a sensing result from an object sensing unit;
determining whether the oncoming vehicle crosses a center line, based on the acquired attribute of the oncoming vehicle,
determining whether at least one of the following conditions included in the acquired attribute of the oncoming vehicle is satisfied, in response to determining that the oncoming vehicle crosses the center line,
  (1) the vehicle is traveling in a lane adjacent to the center line;
  (2) the oncoming vehicle is traveling straight,
  (3) the oncoming vehicle has an obstacle avoidance history; and
  (4) an overlap ratio between the vehicle and the oncoming vehicle falls within a predetermined range; and
performing at least one of a notification of a possibility of collision and a collision avoidance operation, in response to determining that at least one of the above conditions is satisfied.

* * * * *